3,811,982
APPARATUS FOR MANUFACTURING LARGE, BONDED PANEL ELEMENTS SUCH AS WALL ELEMENTS FOR HOUSING CONSTRUCTION
Karl Olav Jacobsen, 2 Ovre Fjellvei,
2010 Strommen, Norway
Filed June 20, 1972, Ser. No. 264,664
Claims priority, application Norway, June 22, 1971,
2,365/71
Int. Cl. B32b *31/04*
U.S. Cl. 156—382                                 9 Claims

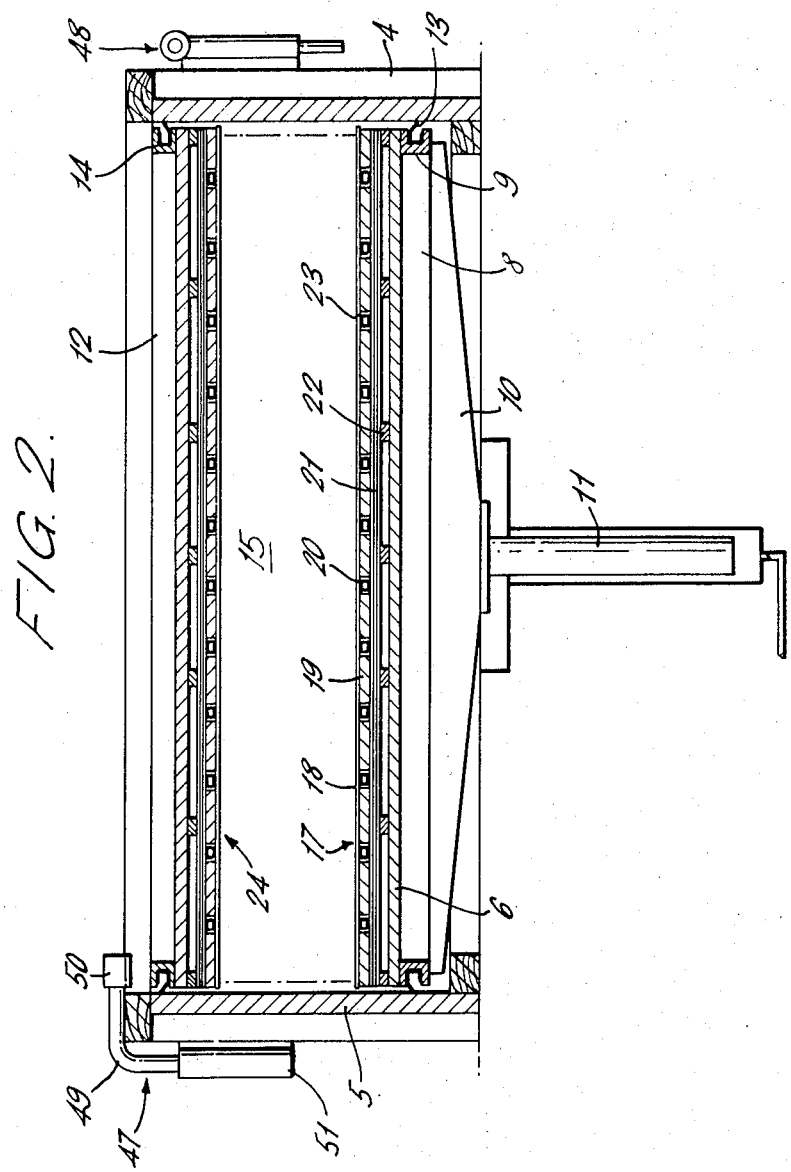

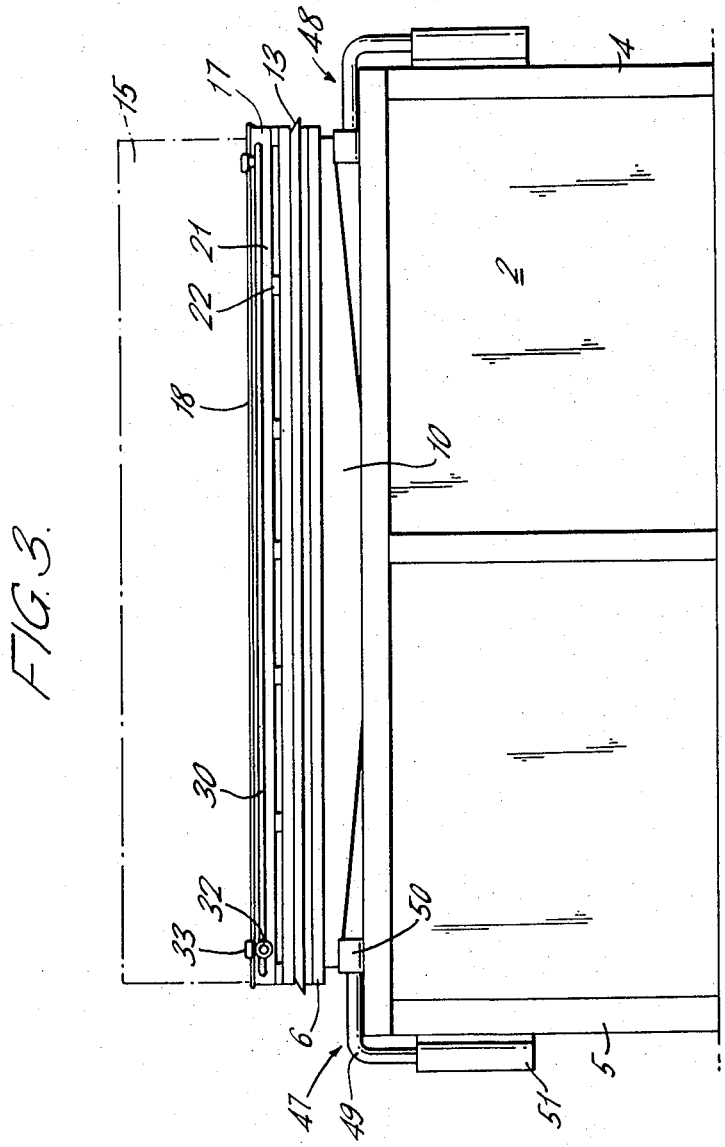

ABSTRACT OF THE DISCLOSURE

An apparatus for manufacturing large, bonded panel elements is disclosed, consisting of a box having a movable top and bottom sealed around the edges against the box wall. The bottom is movably supported by jack means. The elements to be bonded are placed in the box and the interior of the box is put under vacuum, whereby the top is pressed towards the elements, thereby exerting a pressure on the faces to be bonded together.

---

Figure 1:
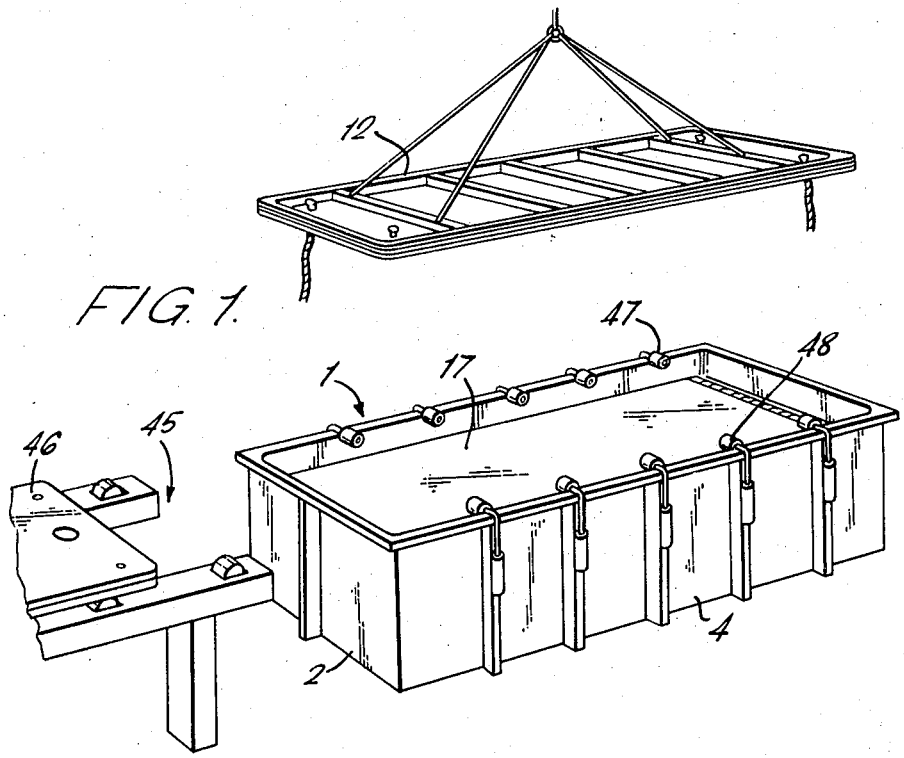

The present invention relates to an apparatus for manufactuiring large, bonded panel elements such as wall elements for housing construction.

At the present time, an ever increasing number of houses are being built of prefabricated elements. Such elements can be constructed in several different ways, and one way is an element construction consisting of two covering panels of plywood having intermediate support elements in the form of ribs and possibly insulation between the ribs. The covering panels are bonded to the supporting elements and preferably also to the insulation. In order to achieve a good bond, it is necessary to apply pressure to the elements. Since conventional hydraulic presses cannot embrace surfaces as large as those in question here, wall, floor and ceiling elements being of lengths up to 10 m. and widths of 3-4 m., the so-called nail-bonding is used today; that is to say that the necessary pressure for the bonding is provided by means of nails which are struck into the bond surface. The present invention has been developed in particular for the production of such prefabricated elements but is not exclusively restricted to the production of such elements.

It is also previously known to use vacuum action for bonding such large panel elements, and, for this purpose, an apparatus is known consisting of a box the internal surface dimensions of which correspond at least to the surface dimensions of the panel elements, and a pressure rigid top having sealing engagement with the walls of the box, the said box being connected to a vacuum source. In such an apparatus, the necessary pressure force is provided by a vacuum within the panel element and in the box, so that the atmosphere thereby exerts pressure on the surface of the element. In this manner, the use of large, and in practice unavailable, hydraulic presses is avoided as is also the time-consuming nail-bonding which also requires extra post-treating of the nailheads prior to painting.

The present invention is based on a known apparatus as described hereinabove, and the particular object of the invention is to adapt the apparatus to a more rational production.

The bonding agents largely in use today have a bonding time of, for example, one half hour, with optional heating during this period, but require a longer setting time, for example, 24 hours. During setting, the bonded surfaces must not be subjected to bending strains, that is to say that the panel elements must not be bent, and problems arise therefore when the panel elements are to be removed from the box when the bonding is finished, since panel elements as large as those in question are difficult to remove by conventional methods without subjecting the panel elements to bending strains. The aim of the invention is therefore to facilitate the removal of the panel elements without subjecting these to bending strains.

An object of the invention is also to permit a reduction of the setting time of the bonding agent and also to control the so-called open time of the bonding agent, preferably to extend the open time of the bonding agent so that it does not begin to bond before the panel element is assembled.

In accordance with the invention an apparatus is provided as disclosed in claim 1. In the novel apparatus the bottom is displaceable and is slidingly sealed against the internal side-walls of the box. The bottom is supported by a lifting means whereby the bottom can be moved vertically.

A primary advantage is that the disposal of the panel elements to be bonded is greatly facilitated. If the panel elements are constructed and bonded outside the box the operation may be undertaken on the loose bottom which is raised by the lifting means and conveyed out to the side to the location where the panel elements are to be constructed. After one or more panel elements have been constructed on the bottom of the box, the entire unit may be brought into place in the box whereafter, by lowering the bottom, the panel elements are disposed in the box, the top being then placed in position. By suctioning out the air between the top and the bottom the necessary vacuum is achieved for pressure bonding of the panel elements in the box.

A second method is to build up the panel elements and apply bonding agent at the same time as the elements are placed in the box, however, the bonding of several panel elements in a deep box entails difficulties in that the working position is extremely uncomfortable. With an apparatus according to the invention, the bottom may be brought up to an upper position in plane with the upper edge of the box and the plate elements may then be laid on the bottom in this position. As the panel elements are constructed, the bottom may be correspondingly lowered by the lifting means for the bottom, and it is then unnecessary to work down inside the box. After the desired number of panel elements have been constructed on the bottom, the top is laid in place and vacuum treatment is provided within the box.

When the pressing time is finished, the bottom is raised once more by the lifting means until the bottom is aligned with the upper edge of the box and the entire stack of bonded panel elements can then be pushed as a unit onto a table arranged at the side of the box. Optionally, the bottom may also be displaced with the stack. In this manner, bending strains to the large panel elements are avoided when removing them from the box. The panel According to the invention, the temperature corresponding stepwise raising of the bottom by the lifting means.

Advantageously, the bottom and the top of the box can be effected as inter-changeable elements, which is a particular advantage when using the method in which the bottom is removed from the box and the panel elements constructed thereupon. While this is taking place, a second bottom/top may be used as bottom for pressing of previously constructed panel elements so that an improved utilization of the press is achieved.

One or more jacks can be utilized as lifting means, said jacks being arranged beneath the box, for example, in excavations in the work floor on which the box rests.

As already mentioned, it is desirable to control the open time of the bonding agent and also the setting time, this is carried out by cooling and heating respectively of the bond joins. To this purpose, pressure plates may, according to the invention, be insected between the panel element/elements and the top and bottom of the box, said pressure plates being provided with temperature controlling elements and having, on the side facing the top/bottom, projections, for example, in the form of parallel strips, adapted for bearing relationship with the top/bottom.

The said temperature controlling elements can optionally be built into the top/or bottom; however, in the preferred embodiments of the top and bottom which are constructions of light wood it has been found that these have a tendency to warp. This is prevented by using pressure plates of the type mentioned hereinabove. The pressure plates can be removable or permanent with respect to the top/bottom.

According to the invention, the temperature controlling elements may be effected as pipes for passage of cooling medium or heating medium respectively.

The side of the pressure plate facing toward the panel element may advantageously be covered with a plate of material having a good heat conducting properties, for example, steel, which covers the temperature controlling elements; the pressure plate can then be otherwise constructed of wood material.

For the manufacture of several panel elements in a pressing operation, it is advantageous to have intermediate plates for insertion between the separate panel elements.

These intermediate plates can be adapted to the internal measurements of the box so that over a substantial area they support the wall of the box. The box may then be of more simple construction since the intermediate plates support the side walls of the box against compression due to the vacuum prevailing in the box during the pressing period.

When it is desirable to control the open time and setting time of the bonding agent, the intermediate plates can, in the same manner as the pressure plates, be provided with in-built temperature controlling elements.

Support rollers may be rotatably mounted along the side walls of the box, it being possible to swing the said rollers from a position outside the box space to operative position beneath the top/bottom.

These support rollers assist in the removal of the top, the bottom, panel elements and top being raised by the lifting means to the extent that the support rollers may be swung in beneath the top, whereafter the entire unit is lowered so that the top rests on the support rollers and may readily be pushed to one side upon the support rollers. The same method can be pushed for removal of the bottom, optionally with the panel elements resting on the bottom. With such removal of the top, it is obviously possible to remove the pressure plates already disposed beneath the top, at the same time. It is also possible to swing in the support rollers for support of selected intermediate plates and thus remove parts of the stack of panel elements pressed in the box.

The invention is not restricted to plane panel elements, since it may well be adapted for manufacture of curved panel elements.

Figure 4:
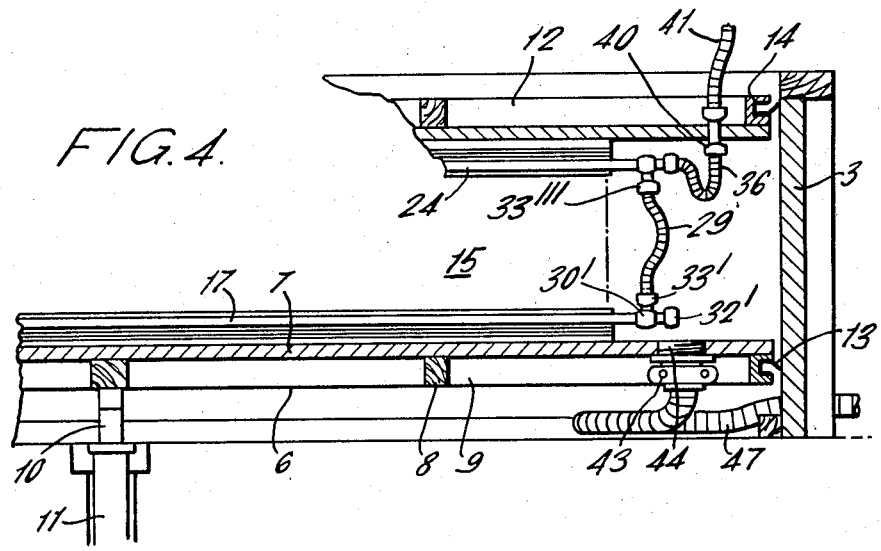
Figure 5:
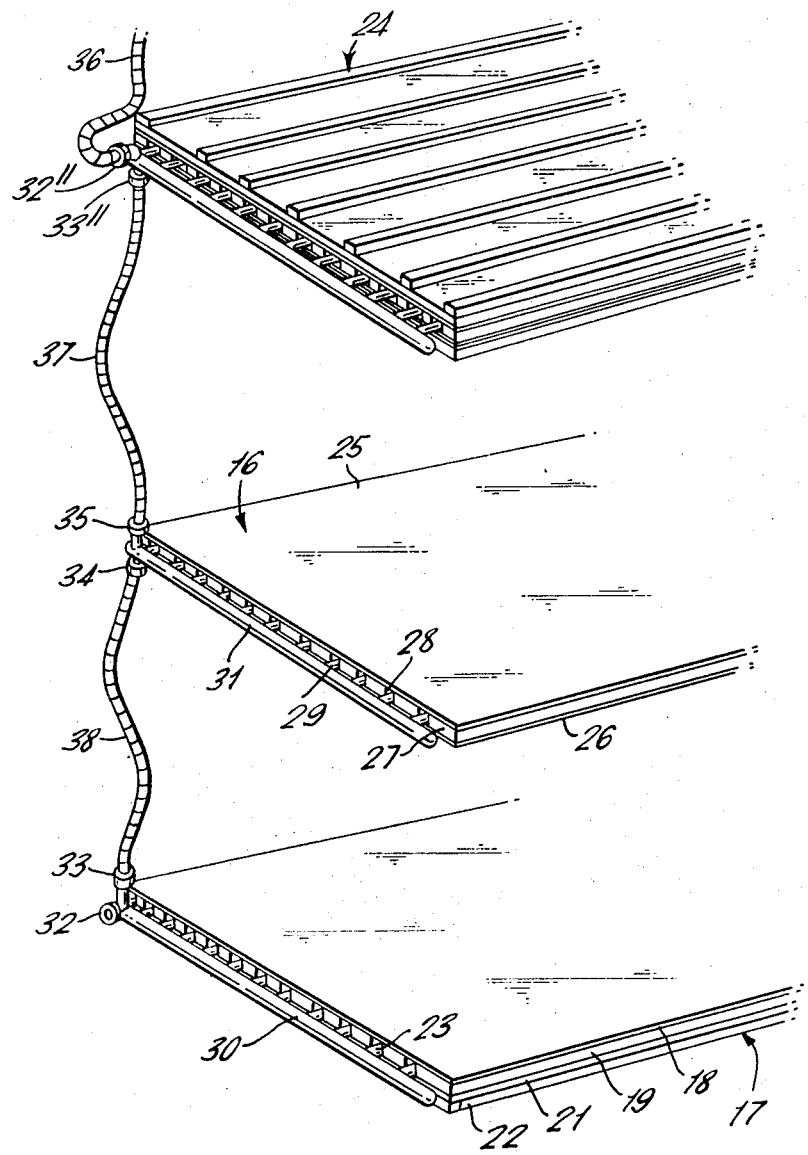

The invention is further explained hereinafter with reference to the drawings, where FIG. 1 is a perspective view of an apparatus according to the invention with the top in raised position. FIG. 2 is a cross-sectional view through the box in FIG. 1. FIG. 3 is an end view of the box of FIG. 1, with the bottom in raised position. FIG. 4 is a partial longitudinal section through the box of FIG. 1, with bottom and top placed in the box beneath and above a stack of panel elements to be pressed. FIG. 5 illustrates two pressure plates and an intermediate plate, having appurtenant coupling system for supply of cooling medium/heating medium.

The box 1 in FIG. 1 is constructed with two opposing equal end walls 2, 3 and with two opposing equal side walls 4, 5. The walls of the box are, in the embodiment example, constructed as a wooden construction, preferably of block board or the like. The bottom 6 is also constructed as a wooden construction with bonded block board 7 which constitute the actual bottom plate and the bottom plate is reinforced by means of ribs 8, 9. These ribs are preferably also produced from block boards or the like. This construction is extremely rigid per se and the rigidity is further ensured in that the bottom 6 of the box rests upon the powerful transverse beams 10 of the jacks 11. On the drawings, only one jack 11 is illustrated with appurtenant transverse beam 10; however, it may be envisaged that, perpendicular to the paper plane in FIG. 2, for example, two or three such jacks are provided which all cooperate in supporting the bottom 6.

The top 12 is constructed in the same manner as the bottom, and both top and bottom are provided with sleeve sealings 13, respectively 14, along the edges thereof inlaid in grooves around the edges. The said sleeve sealings are of a construction known per se and are not further described. They can to advantage be of an inflatable type.

In FIGS. 2 and 4, a stack 15 of panel elements to be bonded is indicated in broken lines. Between the separate panel elements, intermediate plates 16 can be inserted (see FIG. 5). These intermediate plates can, over certain portions, extend out to the walls of the box and support these against external action when vacuum prevails in the box. The said intermediate plates are further described hereinbelow.

A pressure plate 17 rests on the bottom 6, as illustrated in FIGS. 2, 3 and 4. The said pressure plate is constructed of a steel plate 18 which is secured to board 19. The said boards are arranged in parallel and in spaced relationship so that grooves 20 are formed between the boards. On the other side the boards are connected to a block board 21 which extends over the entire pressure plate, and on the outside of the block board, parallel strips 22 are secured. The pressure plate 17 rests with these strips upon the bottom 6. In the groove 20 between the separate boards 19, pipes 23 are laid. These serve as temperature controlling elements. The use of the pipes and the coupling thereof is further explained hereinbelow.

The pressure plate 24, disposed beneath the top 12, is identical to the pressure plate 17 and is not further explained therefore.

The intermediate plate 16 has a construction as illustrated in FIG. 5. The intermediate plate 16 is constructed from two steel plates 25, 26 which are arranged on either side of parallel boards 27. These boards correspond to the boards 19 in the pressure plates 17 and 24 and form, therebetween, parallel grooves 28 for receiving pipes 29 which constitute the temperature controlling elements in the intermediate plate 16.

The pipes 23, respectively 28, in the pressure plates 17, 24, respectively 16, have, in the embodiment example, right angled cross-section and extend in the longitudinal directions of the pressure plates respectively intermediate plates. At each short side of the plates, the separate pipes are connected by means of a manifold pipe 30, respectively 31. In FIG. 5, only one short side is illustrated, the other short side being effected in the same manner. The manifold pipe 30 is provided in one end, as illustrated in FIG. 5, with two rapid couplings 32, 33 (see also FIG. 4). In the same manner, the manifold pipe 30 in intermediate plate 16 is provided with two rapid couplings 34, 35. The rapid coupling 32 on the manifold pipe 30 is arranged at the right angles with respect to the rapid coupling 33 and in direction of the extension of the pipes 23. The rapid coupling 33 is directed such that it faces upwardly when the pressure plate 17 is used in connection with the bottom of the box and faced downwardly when the pressure plate is utilized in connection with the top of the box. This is clear, moreover, from FIGS. 4 and 5. This pressure coupling is of the known type which is closed when no tube is connected, but automatically opens when the tube is connected.

When using the temperature control elements in pressure plates and intermediate plates, the temperature control elements of the plates are interconnected as illustrated in FIG. 5. From a source of cooling medium, respectively heating medium (not shown), a conduit 36 leads to the rapid coupling 32″ on the pressure plate 24. From the rapid coupling 33″ a flexible tube 37 leads down to the rapid coupling 35 on the intermediate plate 16, and a flexible tube 38 connects the pipe system of the intermediate plate with the pipe system of the pressure plate 17. The following method is followed for the connection; the tube 38 is first connected to the rapid coupling 33, the intermediate pipe 16 is thereafter laid in place and the tube 38 is connected to the rapid coupling 34. The tube 37 is then connected to the rapid coupling 35 and, after the pressure plate 24 has been laid in place, the tube 37 can be connected to the rapid coupling 33″, whereafter the tube 36 can be connected to the rapid coupling 32″. The same connection is carried out at the other end of the plates so that an outlet is obtained. The tube 36, by means not shown, can be supplied with a cooling medium or a heating medium, for example, steam. It is also possible to have two parallel systems, however, it is generally possible to use the same system both for the cooling and the heating medium.

In FIG. 4, a connection is illustrated between a pressure plate 17 and a pressure plate 24 without intermediate plate. A flexible conduit 39 is connected to the rapid coupling 33′ on the pipe system of the pressure plate 17 and is connected to the rapid coupling 33‴ in the pipe system of the pressure plate 24. The tube 36 is in FIG. 4, connected to a rapid coupling 40 in the top 12 and a tube 41 leads from the top 12.

A vacuum is effected in the interior of the box, that is to say between the top and the bottom, by means of vacuum, not shown, which suctions air from the box through the tube 42. The tube 42 is flexible and is, by means of a rapid coupling 43 of type known per se, connected to the bottom 6. The bottom 6 has a through-opening 44 in the area of the connection and opens into the tube 42. During the movement of the bottom 6 upwardly and downwardly in the box by the lifting means 11, the tube 42 bends and twists and accompanies the movement. If the bottom is to be removed from the box, the connection 43 is released from the upper side of the bottom. This is a technique which is known per se and is not further described herein.

In FIG. 1, the box is shown with the bottom arranged in the box and with a pressure plate 17 arranged on the bottom. The top 12 is shown in raised position it being illustrated as suspended in a conventional rope sling arrangement. At one short end 2, a roller path 45 is arranged upon which a bottom 46 rests. The bottom 46 is of the same embodiment as the bottom 6, respectively the top 12.

On the long sides 4 and 5 of the box, support rollers 47, 48 are arranged. A more detailed construction of these is illustrated in Figures 2 and 3. The support roll 47 consists of a roller 50 freely mounted on an angular rod 49. The other end of the angular rod 49 is rotatably mounted in a sleeve 51 rigidly mounted on the box wall 5. The rod 49 is adapted to move upwardly and downwardly in the sleeve 51. By lifting the rod 49 so that the roller 50 is freed from the upper edge of the wall 5, it is possible to swing the support roller 47 out to the side and to lower this to the position illustrated on the right-hand side in FIG. 2, of the support roller 48. The support rollers are then in a position outside the cavity of the box. When the support rollers are to be used, the bottom with mounted pressure plate and with panel element stack is, for example, raised as illustrated in FIG. 2, by lifting means whereafter the support rollers 47, 48 are swung in as illustrated on FIG. 3. Thereafter, the bottom is lowered until it bears against the support rollers and the lifting device can then be further lowered whereafter the bottom with pressure plate and panel element stack can be pushed out and over onto roller path 45. Correspondingly, the bottom 46 with panel elements having bonding agent already applied (not shown in FIG. 1) can be pushed from the roller path 45 and over onto the rollers 47, 48 and raised from the rollers by lifting means, whereafter the rollers are swung out to the side, as shown on the right-hand side in FIG. 2, and the bottom with its load can then be lowered into the box by the lifting means. Optionally the support rollers can also be used for removal of the top 12.

Various methods are possible with the box, since the panel elements can be built up in the actual box and the bottom can be successively lowered by the lifting means, so that a favourable working height is achieved at all times; it being also possible to remove the bottom from the box and build up the plate elements on the bottom outside the box, the box being utilized for pressing of previous stack of plate elements. By means of the box, a favourable method has been created for manufacturing large panel elements, both plane and curved. The box is inexpensive to construct since it can be made for greater part, with respect to the actual box, top and bottom and also pressure plates and intermediate plates, from wood material. At the same time, the entire press is of little weight so that substantial foundation problems are avoided. Instead of suctioning air through the bottom, it is obviously also possible to suction the air through the top. In cases where the bottom and top are equal, it is possible in a simple manner to close the suction opening in the plate which is at that time the top plate, when the suctioning is to take place through the bottom plate or the reverse.

As cooling medium, respectively heating medium, a number of known agents can be used.

Having described my invention, I claim:

1. Apparatus for manufacturing large, bonded panel elements, consisting of a box the internal surface dimension of which at least corresponds to the panel dimension of the panel elements, and the top and bottom, relatively displaceable at right angles to the light opening of the box and with sealing engagement with the walls of the box, the said box being connectable to a source of vacuum which produces a vacuum in the box so that the external atmospheric pressure will effect a relative displacement of the top and bottom towards one another to exert a pressure on one or more panel elements disposed in the box, characterized in that the bottom of the box is movably supported by a lifting means for vertical movement of the bottom to and from a position at or below the top edge of the box to and from a position within the box, the bottom around its edge, being provided with a sealing which, during movement of the bottom within the box, is in slidingly sealed relationship with the internal sides of the walls of the box.

2. Apparatus according to claim 1, characterized in that the bottom and top of the box are effected as interchangeable elements.

3. Apparatus according to claim 1, characterized in that the lifting device has one or more hydraulic jacks arranged beneath the box.

4. Apparatus, particularly according to claim 1, characterized by pressure plate insertable between the panel element/elements and the top and bottom of the box, and provided with temperature controlling elements said pressure plates having, on the side facing the top/bottom, projections, for example, in the form of parallel strips adapted for bearing against the top/bottom.

5. Apparatus according to claim 4, characterized in that the temperature controlling elements are effected as pipes for conveying cooling medium, respective heating medium.

6. Apparatus according to claim 4, characterized in that the side of the pressure palte which faces towards the panel element/elements is covered with a sheet of material having good heat-conducting properties, for example steel, said sheet covering the temperature controlling elements, and in that the pressure plate is otherwise constructed of wood material.

7. Apparatus according to claim 1, characterized in that it includes intermediate plates for insertion between the separate panel elements when producing a plurality of panel elements in one pressing operation.

8. Apparatus according to claim 7, characterized in that the intermediate plates are adapted to the internal measurements of the box so that certain portions support the box walls.

9. Apparatus according to claim 7, characterized in that the intermediate plates are provided with inlaid temperature controlling elements.

References Cited
UNITED STATES PATENTS

| | | | |
|---|---|---|---|
| 1,100,452 | 6/1914 | Stehm | 249—74 |
| 2,610,938 | 9/1952 | Pasquier | 156—381 |
| 2,664,835 | 1/1954 | Sorensen | 156—71 |
| 3,496,052 | 2/1970 | Odenthal | 156—285 |

ALFRED L. LEAVITT, Primary Examiner

C. WESTON, Assistant Examiner

U.S. Cl. X.R.

156—71, 285; 249—74, 76, 136